Patented Jan. 2, 1940

2,185,465

UNITED STATES PATENT OFFICE 2,185,465

PROCESS OF PREPARING SALAD DRESSING

Dean C. Ingraham, Kensington Park, and Wing Wong, Berkeley, Calif., assignors to The Glidden Company, Cleveland, Ohio, a corporation of Ohio No Drawing. Application July 18, 1938,
Serial No. 219,822

6 Claims. (Cl. 99—144)

The present invention relates to the production of salad dressing, and more particularly to the type of salad dressing known as French dressing.

The common practice in the manufacture of French dressing is to mix together all of the dry ingredients such as salt, sugar, mustard, paprika and gum. Enough of the salad oil is then added to the mixture of dry ingredients to wet and cover each particle with a film of oil. About two thirds of the water is then added which produces a thin solution, gradually changing to a viscous mass as the gum dissolves in the water. Oil is then added with continuous beating, similar to the method of emulsification in the manufacture of mayonnaise. After all the oil is added the mass has a thick viscous appearance. The balance of the water and the vinegar is then added with slow agitation, the material thinning out to the familiar consistency of French dressing.

French dressing made according to this procedure, however, fades rapidly in bright sunlight. While the spice value of paprika is good, its flavor is not strong and it adds a pleasing and characteristic flavor to French dressing. The color of the paprika fades, however, which causes fading of the dressing.

According to the present invention a process is provided whereby a French dressing with more intense color and with improved resistance to fading may be made.

According to the present invention it is proposed to wet the paprika pigment with water before incorporation with the oil. The paprika pigment is oil soluble and is dispersed in the oil by the old prior art process. Apparently the pigment in oil solution is quite susceptible to fading. The essential difference between the present process and that of the prior art is in the wetting of the paprika with water instead of oil whereby more intense color and improved resistance to fading is obtained.

According to a preferred procedure in carrying out the present invention, the paprika is not added with the other dry ingredients but is added last with the last portion of water and vinegar. It has been found that best results are obtained by using finely powdered paprika and mixing it with the water and vinegar with rapid agitation.

The following is illustrative of the invention:

| | Pounds |
|---|---|
| Sugar | 14.0 |
| Salt | 3.0 |
| Mustard | .7 |
| Paprika | 1.5 |
| Gum tragacanth | .4 |
| Water | 16.4 |
| 60 grain vinegar | 22.0 |
| Salad oil | 42.0 |
| | 100.0 |

Sift the gum tragacanth and all of the other dry ingredients, except the paprika into a mixer. Add just enough oil to wet the mixture. Add 4.4 lbs. of water to swell the gum tragacanth to produce a viscous mass. Add the balance of the oil slowly as in making mayonnaise. While these operations are going on, the vinegar, the balance of the water, and the paprika may be agitated in a tank above the mixer. Efficient agitation is necessary to keep the paprika in suspension. After the oil has been added, the suspension of paprika in the vinegar and water is added with sufficient mixing to produce the finished dressing.

It is to be understood that the example is merely illustrative of the invention and that various changes and modifications in the process may be made without departing from the spirit of the invention. Preferably most of water is added at the last with the vinegar and paprika. Experimental lots of French dressing were made in which the vinegar and water wet paprika were added before and after the oil was emulsified into the dressing. The order of adding the water wet paprika made no difference in the color and resistance to fading. The essential thing seems to be to keep the paprika in the water phase. The method of adding the paprika last in the larger portion of the water and with the vinegar is preferable in that it insures a better distribution of the paprika. If the paprika is added to the smaller portion of the water phase, the distribution may not be as perfect, although this may be corrected by longer or more efficient agitation. Accordingly, the broad feature of the invention is considered to reside in wetting all of the dry ingredients except the paprika with oil, and in wetting the paprika with water.

We claim:

1. The process of making a salad dressing which comprises wetting all of the dry ingredients except paprika with a salad oil prior to the addition of any water to the dry ingredients, wetting the paprika with water, and incorporating the water wet paprika with the other ingredients of the dressing.

2. The process of making French salad dressing comprising dry ingredients including paprika, salad oil, water and vinegar which comprises wetting all of the dry ingredients except the paprika with a portion of the salad oil, adding a portion of the water to the oil wet ingredients, emulsifying the remainder of the oil with the mixture so prepared, wetting and dispersing the paprika in the remainder of the water containing the vinegar and adding the water containing the vinegar and water wet paprika to said emulsion.

3. The process of making salad dressing which comprises wetting all of the dry ingredients except paprika with a salad oil prior to the addition of any water to the dry ingredients, wetting paprika with a mixture of water and vinegar. and incorporating the water wet paprika with the remaining ingredients of the salad dressing.

4. The process of making French salad dressing which comprises wetting all of the dry ingredients except paprika with a salad oil prior to the addition of water to the dry ingredients, adding a portion of the water to the oil wet dry ingredients and emulsifying, wetting paprika with water, and incorporating the water wet paprika with the emulsion formed and other ingredients of the salad dressing.

5. The process of making French salad dressing which comprises wetting all of the dry ingredients with salad oil prior to the addition of any water to the dry ingredients, adding water to the oil wet ingredients and emulsifying wetting paprika with water containing vinegar and incorporating the thus wetted paprika to the emulsion formed and the other ingredients of the salad dressing.

6. The process of making French salad dressing which comprises wetting all of the dry ingredients with a portion of the salad oil prior to the addition of any water to the dry ingredients, adding a portion of the water to the oil wet ingredients, emulsifying the remainder of the salad oil with the mixture so prepared, wetting and dispersing the paprika in the remainder of the water, and incorporating the thus wetted paprika with the emulsion formed and the remaining ingredients of the salad dressing.

DEAN C. INGRAHAM.
WING WONG.